United States Patent
Jeong et al.

(10) Patent No.: US 7,827,322 B2
(45) Date of Patent: *Nov. 2, 2010

(54) METHOD AND APPARATUS FOR PROTECTING DATA DURING STORAGE/RETRIEVAL

(75) Inventors: Seung-Youl Jeong, Hwaseong-si (KR); Jong-Lak Park, Suwon-si (KR); Hak-Yeol Sohn, Seoul (KR); Sung-Youn Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 12/291,623

(22) Filed: Nov. 12, 2008

(65) Prior Publication Data

US 2009/0077391 A1    Mar. 19, 2009

Related U.S. Application Data

(62) Division of application No. 10/867,267, filed on Jun. 14, 2004, now Pat. No. 7,469,303.

(30) Foreign Application Priority Data

Jun. 26, 2003    (KR)    ............................ 2003-0042137

(51) Int. Cl.
*G06F 3/00* (2006.01)
*G06F 13/00* (2006.01)

(52) U.S. Cl. .............................. 710/5; 710/68; 713/150; 713/153; 713/165; 713/193; 713/202; 711/112; 711/114; 711/163

(58) Field of Classification Search .................. 710/5, 710/68; 713/150, 153, 193, 202, 165; 711/112, 711/114, 163

See application file for complete search history.

(56) References Cited

U.S. PATENT DOCUMENTS

| 6,209,099 | B1 * | 3/2001 | Saunders .................... 726/22 |
| 6,636,966 | B1 * | 10/2003 | Lee et al. .................... 713/165 |
| 6,742,094 | B2 * | 5/2004 | Igari .......................... 711/163 |
| 6,748,488 | B2 * | 6/2004 | Byrd et al. .................. 711/114 |
| 7,076,666 | B2 * | 7/2006 | Unger et al. ................ 713/189 |
| 7,110,982 | B2 * | 9/2006 | Feldman et al. ............... 705/51 |
| 7,339,869 | B2 * | 3/2008 | Ishibashi et al. ......... 369/53.21 |
| 7,596,691 | B2 * | 9/2009 | Koue et al. .................. 713/154 |
| 2002/0188856 | A1 * | 12/2002 | Worby ........................ 713/193 |
| 2004/0123127 | A1 * | 6/2004 | Teicher et al. ............... 713/193 |

FOREIGN PATENT DOCUMENTS

JP    2001-109581    *    4/2001

* cited by examiner

*Primary Examiner*—Tammara Peyton
(74) *Attorney, Agent, or Firm*—Monica H Choi

(57) ABSTRACT

For protecting data during transmission between a host device and a data storage device, the host device encrypts command-related information and sends the encrypted command-related information to the data storage device. The data storage device decrypts the encrypted command-related information, interprets the decrypted command-related information to generate interpreted commands, and executes the interpreted commands.

10 Claims, 5 Drawing Sheets

METHOD AND APPARATUS FOR PROTECTING DATA DURING STORAGE/RETRIEVAL

The present application is a divisional of an earlier filed patent application with Ser. No. 10/867,267 filed on Jun. 14, 2004 now U.S. Pat. No. 7,469,303, for which priority is claimed. This earlier filed patent application with Ser. No. 10/867,267 is in its entirety incorporated herewith by reference.

The present application also claims priority under 35 USC §119 to Korean Patent Application No. 2003-0042137, filed on Jun. 26, 2003, in the Korean Intellectual Property Office, the disclosure of which is incorporated herein in its entirety by reference. A certified copy of Korean Patent Application No. 2003-0042137 is contained in the parent patent application with Ser. No. 10/867,267.

BACKGROUND OF THE INVENTION

1. Field of the Invention

The present invention relates to data storage/retrieval, and more particularly, to protecting data from outside hacking when transmitting the data between a host device and a data storage device.

2. Description of the Related Art

Commands for transmitting data between a host and a data storage device such as a hard disk drive (HDD) are typically performed by the following process.

First, the host device transmits commands and necessary information such as logic block address (LBA) information and sector counter information to the HDD by using command registers included in a host interface circuit.

Then, the HDD interprets the commands and the information transmitted from the host device and performs operations such as write or read according to the interpretation.

Yet, when transmitting the commands between the host device and the data storage device, data is unprotected and can be a target of hacking.

Technology to solve this problem is disclosed in Japanese Patent Laid-Open Publication No. 2000-298942 entitled "Disk Storage Device and Copy Preventing System Applied to This Device". In this document, data is encrypted when it is transmitted between the HDD and the host device. But, this technology has a disadvantage in that it takes considerable time to encrypt and decrypt a large amount of data.

SUMMARY OF THE INVENTION

The present invention protects data without requiring extra hardware in a host of a data storage/retrieval system, through a series of processes including: encrypting command-related information, transmitting the encrypted information, and decrypting and restoring the encrypted information in a drive.

A data storage/retrieval system according to an aspect of the present invention includes a host device for protecting data. The host device includes a host controller and a first memory having sequences of instructions stored thereon. Execution of the sequence of instructions by the host controller causes the host controller to perform the step of: encrypting command-related information. In addition, the host device includes a host interface that transmits the encrypted command-related information to a data storage device.

In another aspect of the present invention, the data storage/retrieval system includes the data storage device having a drive interface for receiving the encrypted command-related information. The data storage device also includes a drive controller and a second memory having sequences of instructions stored thereon. Execution of the sequence of instructions by the drive controller causes the drive controller to perform the steps of: decrypting the encrypted command-related information; interpreting the decrypted command-related information to generate interpreted commands; and executing the interpreted commands by the data storage device.

In a further aspect of the present invention, the host controller includes a host CPU command register for storing the command-related information before being encrypted, and the host interface includes a host interface command register for storing the encrypted command-related information.

In yet another aspect of the present invention, the drive interface includes a drive interface command register for storing the encrypted command-related information, and the drive controller includes a drive CPU command register for storing the decrypted command-related information.

The present invention may be practiced to particular advantage when the data storage device is a HDD (hard disk drive). In that case, the command-related information includes at least one of read or write command information and LBA (logic block address) information and/or sector counter information used for addressing hard disks of the HDD.

BRIEF DESCRIPTION OF THE DRAWINGS

The above and other features and advantages of the present invention will become more apparent by describing in detail exemplary embodiments thereof with reference to the attached drawings in which.

The figures referred to herein are drawn for clarity of illustration and are not necessarily drawn to scale. Elements having the same reference number in FIGS. 1, 2, 3, 4, and 5 refer to elements having similar structure and/or function.

DETAILED DESCRIPTION OF THE INVENTION

The present invention will now be described more fully with reference to the attached drawings, in which exemplary embodiments thereof are shown.

Figure 1:
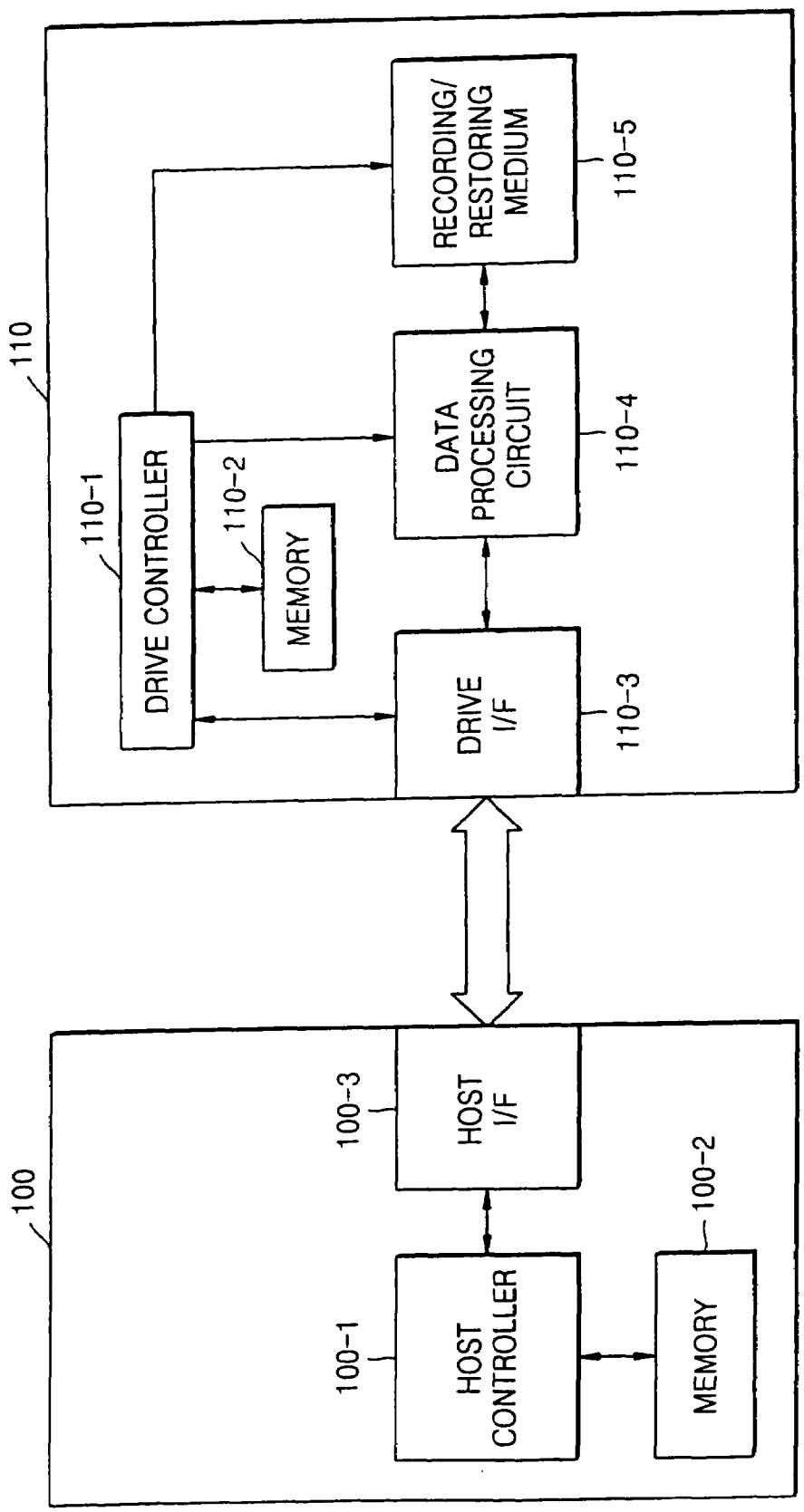
FIG. 1 is a block diagram of a data protecting apparatus in a data storage/retrieval system according to an embodiment of the present invention.
Figure 5:
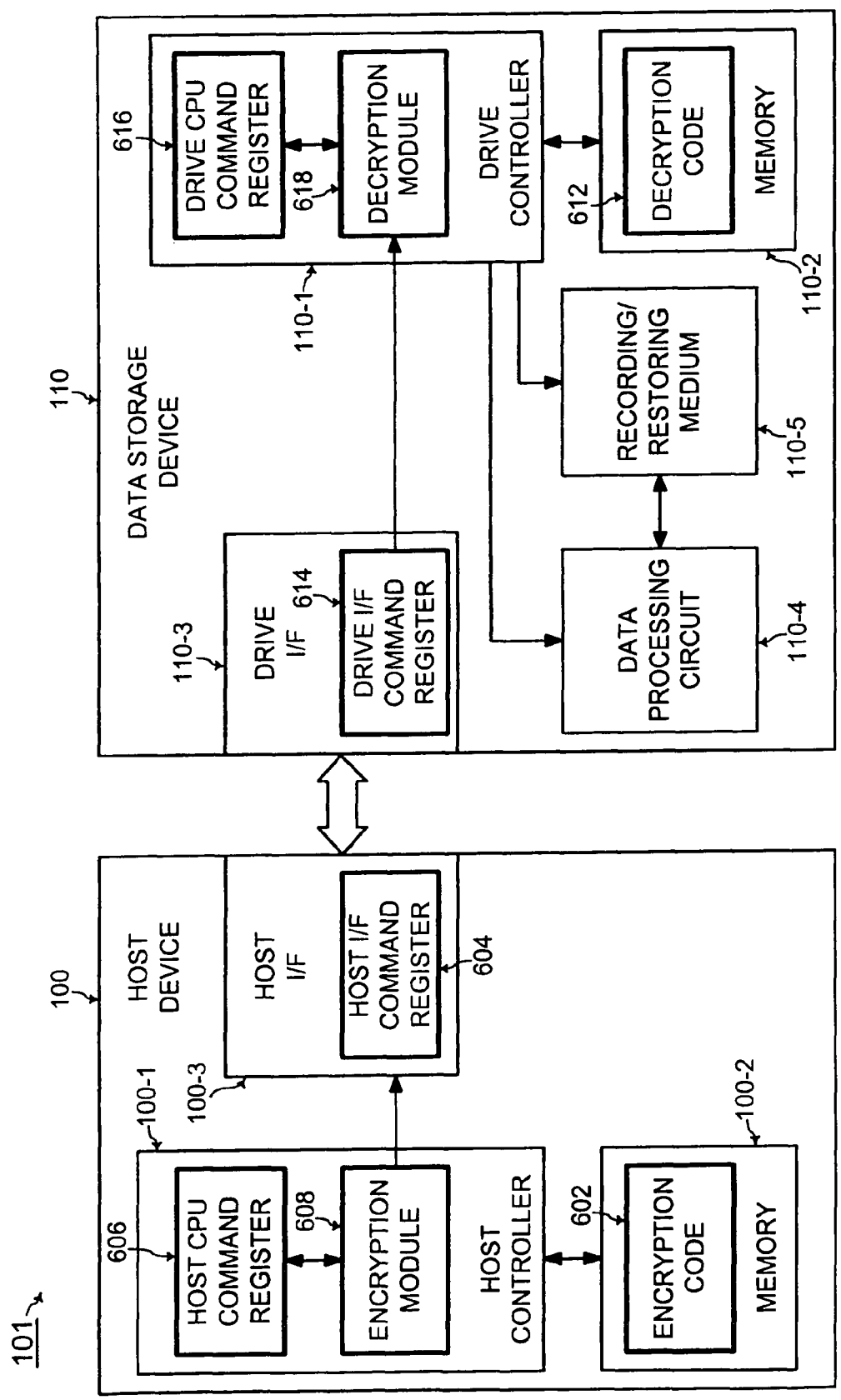
FIG. 5 is a more detailed block diagram of the data storage/retrieval system of FIG. 1, according to an embodiment of the present invention.

FIGS. 1 and 5 show block diagrams of a data protecting apparatus in a data storage/retrieval system 101 according to an embodiment of the present invention.

Referring to FIGS. 1 and 5, the data storage/retrieval system 101 comprises a host device 100 and a data storage device 110. The host device 100 comprises a host controller 100-1, a memory 100-2, and a host interface circuit 100-3. The data storage device 110 comprises a drive controller 110-1, a memory 110-2, a drive interface circuit 110-3, a data processing circuit 110-4, and a recording/restoring medium 110-5.

Components of the host device 100 are now described.

Referring to FIGS. 1 and 5, a well-know encryption algorithm program (i.e., an encryption code 602) such as 3DES, SEED, and AES, is stored in the memory 100-2.

The host interface circuit 100-3 includes a host interface command register 604. The host interface circuit 100-3 transmits command-related information and data to the data storage device 110 connected to the host device 100, and receives data restored from the data storage device 110, according to an intelligent drive electronics (IDE) interface standard.

The host controller 100-1 includes a host central processing unit (CPU) command register 606 which temporarily stores command-related information. In case the command-related information stored in the host CPU command register 606 is transmitted to the data storage device 100, the host controller 100-1 encrypts the command-related information according to the encryption program 602 and stores the encrypted information in the host interface command register 604 of the host interface circuit 100-3.

The encryption program 602 is a sequence of instructions stored within the memory 100-2 which when executed by an encryption module 608 of the host controller 100-1 (which is a data processing device) encrypts the command-related information stored in the host CPU command register 606. The host controller 100-1 then stores the encrypted command-related information in the host interface command register 604 of the host interface 100-3. The above command-related information includes command information such as read and write commands, logic block address (LBA) information, and sector counter information. The LBA information and the sector counter information are used for addressing hard disks within the recording/restoring medium 110-5 when the data storage device 110 is a HDD (hard disk drive) for example.

According to one aspect of the present invention, the host interface command register 604, the host CPU command register 606, and the memory 100-2 are hardware components that typically are available in host devices. Thus, the host device 100 encrypts the command-related information and transmits the encrypted information to the data storage device 110 without the use of extra hardware. In addition, the data can be safely transmitted to the data storage device 110 since the encrypted LBA value or sector counter value of the data is not exposed without data encryption during such transmission.

Next, the data storage device 110 is described. The present invention is described for the example of the data storage device 110 being a HDD (hard disk drive). However, aspects of the present invention may advantageously be applied for any other types of data storage devices aside from the example of the HDD.

A decryption algorithm program (i.e., a decryption code) 612 to decrypt the information that is encrypted by the encryption code 602 stored in the memory 100-2 of the host device 100 is stored in the memory 110-2 of the data storage device 110. The key for decryption is stored in the memory 110-2 of the data storage device 110, just as the corresponding key for encryption is stored in the memory 100-2 of the host device 100.

The drive interface circuit 110-3 includes a drive interface command register 614. The drive interface circuit 110-3 receives the encrypted command-related information (and any other data stored in any registers of the host device 100 connected to the drive interface circuit 110-3), according to the IDE interface standard. In addition, the drive interface circuit 110-3 transmits restored data retrieved within the data storage device 110 to the host device 100, according to the IDE interface standard.

The drive controller 110-1 includes a drive CPU command register 616 which temporarily stores the command-related information. The decryption program 612 is a sequence of instructions stored within the memory 110-2 which when executed by a decryption module 618 of the drive controller 110-1 (which is a data processing device) decrypts the encrypted command-related information as stored in the drive interface command register 614.

After the decryption module 618 of the drive controller 110-1 decrypts the encrypted command-related information as stored in the drive interface command register 614, the drive controller 110-1 stores the decrypted information in the drive CPU interface command register 616. In addition, the drive controller 110-1 interprets the decrypted command-related information as stored in the drive CPU interface command register 616 to generate interpreted commands. The drive controller 110-1 controls operation of the HDD 110 to execute the interpreted commands.

For example, the drive controller 110-1 controls the movement of a transducer (not shown), included in the recording/restoring medium 110-5 to a target track using the LBA and sector counter values as indicated in the decrypted command-related information.

The data processing circuit 110-4, including a read channel circuit (not shown), a write channel circuit (not shown), and a pre-amplifier circuit (not shown), performs data processing for operation of the HDD 110. In another aspect of the present invention, the data processing circuit 110-4 also performs encryption/decryption for data that is stored/retrieved into/from the recording/restoring medium 110-5.

For example, the data processing circuit 110-4 stores data into the recording/restoring medium 110-5 by decrypting data received by the drive interface circuit 110-3 using a control signal that is generated according to the interpretation result of the decrypted command-related information of the drive controller 110-1. Alternatively, the data processing circuit 110-4 outputs data to the drive interface circuit 110-3 by encrypting data retrieved from the recording/restoring medium 110-5.

The recording/restoring medium 110-5 as the storage medium of the HDD 110 is controlled by the drive controller 110-1. The recording/restoring medium 110-5 includes an actuator (not shown) with a transducer for recording/restoring data on/from hard disks of the HDD 110 and a mechanism for rotating the hard disks.

According to one aspect of the present invention, the drive interface command register 614, the drive CPU command register 616, and the memory 110-2 are hardware components that typically are available in the data storage device 110. Thus, the data storage device 110 decrypts the encrypted command-related information that is received from the host device 100 without extra hardware.

In addition, the data storage device 110 operates within the data storage/retrieval system 101 according to the decrypted command-related information. Thus, data is safely stored/retrieved into/from the data storage device 110 since the LBA and sector counter values transmitted as the encrypted command-related information are not exposed without data encryption during transmission between the host device 100 and the data storage device 110.

A method of protecting data in a data storage/retrieval system according to an embodiment of the present invention will be explained with reference to FIGS. 2 and 3.

Figure 2:
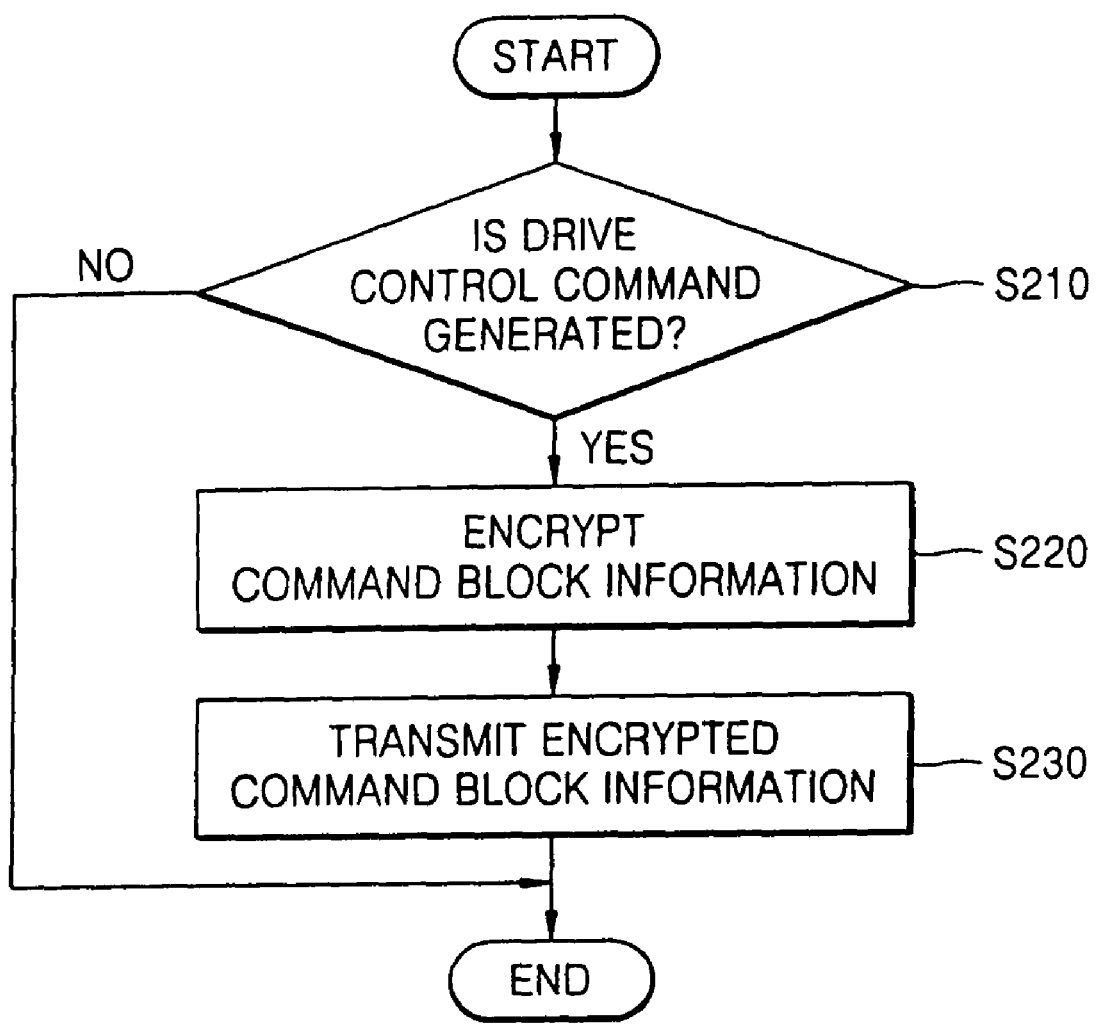
FIG. 2 is a flow chart illustrating a command encryption process performed in a host device of the data protecting apparatus of FIG. 1.
Figure 3:
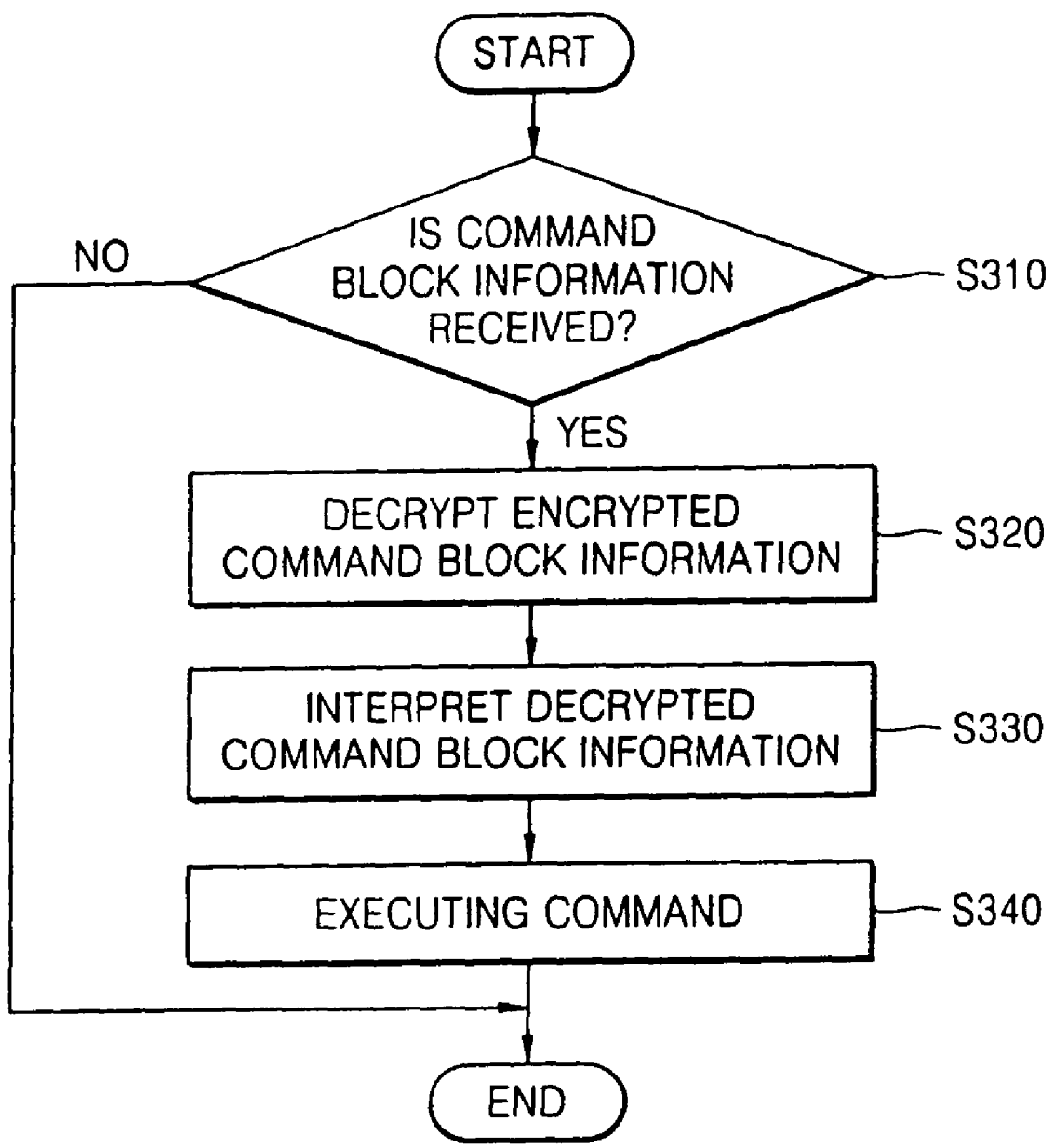
FIG. 3 is a flow chart illustrating a command decryption process performed in a data storage device of the data protecting apparatus of FIG. 2.

FIG. 2 is a flow chart illustrating an encrypting and transmitting process which protects data from the host device 100. FIG. 3 is a flow chart illustrating a decrypting process performed in the data storage device 110.

First, the process of encrypting and transmitting command-related information is described with reference to FIGS. 2 and 5.

The host device 100 determines whether a drive control command, to be transmitted to the data storage device 110, is generated in step S210. Examples of the drive control command are a write command for storing data in the data storage device 110, and a read command for retrieving data from the data storage device 110.

In the case where the drive control command is generated at step S210, command-related information is encrypted in step S220. The command-related information includes command information such as a write or read command, logic block address (LBA) information, and sector counter information.

The host device 100 transmits the encrypted command-related information to the data storage device 100 via the host interface circuit 100-3, according to an interface standard such as the intelligent drive electronics (IDE) interface standard, in step S230.

Next, the process of decrypting the encrypted command-related information within the data storage device 110 is described with reference to FIGS. 3 and 5.

The data storage device 110 determines whether an encrypted command-related information is received from the host device 100 in step S310.

In the case where an encrypted command-related information is received at step S310, the encrypted command-related information is decrypted in step S320. The decrypting process uses the same key value as that utilized in the encrypting process in S220, according to one example embodiment of the present invention.

Then, the data storage device 110 interprets the decrypted command-related information and executes commands according to the interpretation results in steps S330 and S340.

Figure 4:
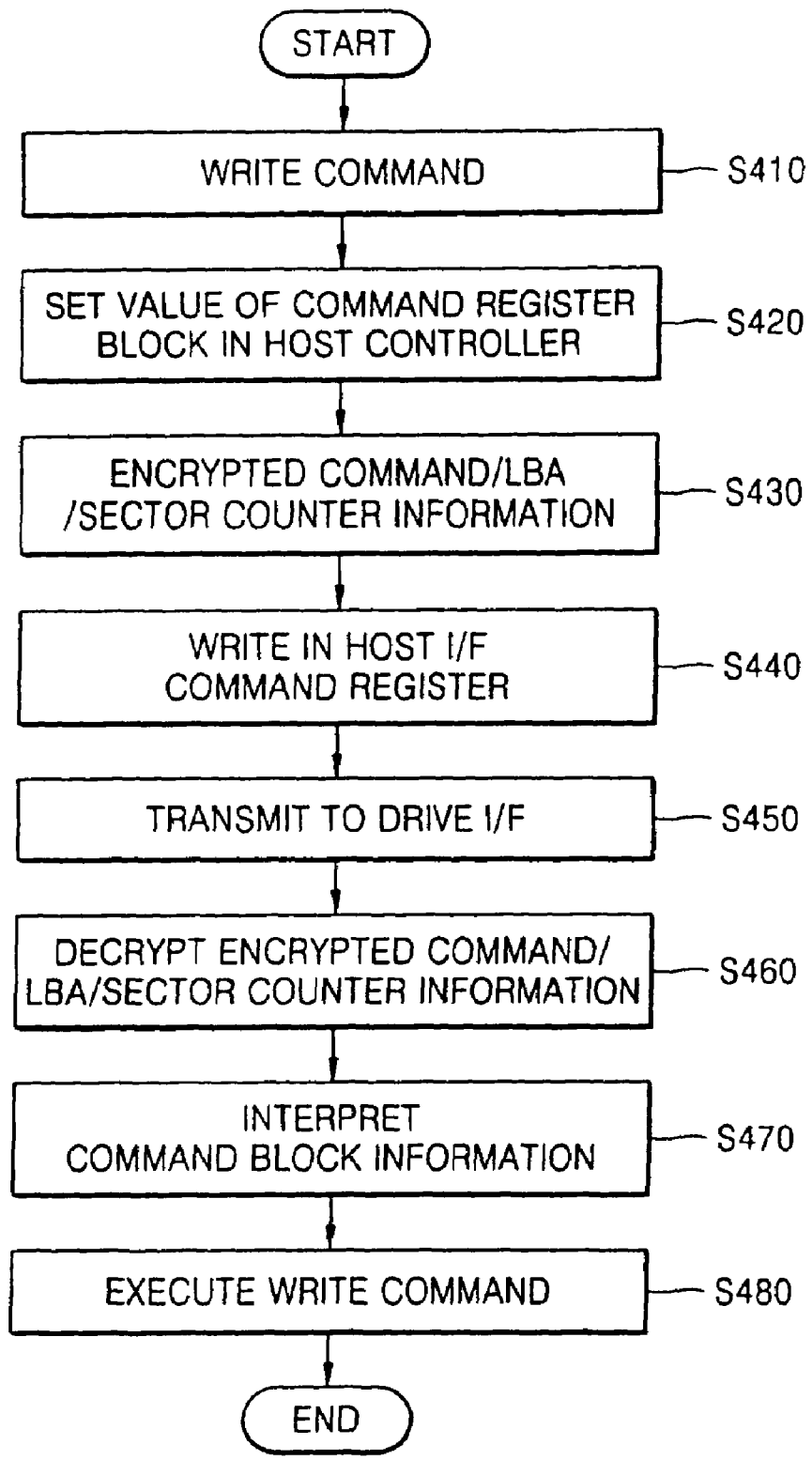
FIG. 4 is a flow chart illustrating a method of protecting data in a data storage/retrieval system according to an embodiment of the present invention.

FIG. 4 is a flow chart illustrating a method of protecting data when executing a write command according to an embodiment of the present invention.

Referring to FIGS. 4 and 5, information requiring a write operation is input to a host controller 100-1 in step S410. Thus, the host controller 100-1 sets and writes write command-related information in the host CPU command register 606 in step S420. The write command-related information including write command information, LBA information, and sector counter information is encrypted in step S430.

The write command information, the LBA information, and the sector counter information encrypted in the step S430 are written to the host interface command register 604 inside the host interface 100-3 in step S440.

Then, the write command information, the LBA information, and the sector counter information as encrypted and stored in the host interface command register 604 are transmitted to the drive interface circuit 110-3 and written to the drive interface command register 614 in step S450.

In step S460, the drive controller 110-1 decrypts the encrypted write command information, the LBA information and the sector counter information stored in the drive interface command register 614 by using the same key value as that utilized in the encrypting process of step S430.

The drive controller 110-1, then, interprets the decrypted write command information, the LBA information, and the sector counter information and executes the write command corresponding to the interpretation results in steps S470 and S480.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, the present invention as described herein may be embodied as a method, an apparatus, a system, etc. When implemented in software, elements of the present invention are code segments that perform disclosed processes. Programmes or code segments can be stored in a processor readable medium or transmitted by a computer data signal coupled with a carrier in a transmission medium or a network. The processor legible medium includes an electronic circuit, a semiconductor memory device, a read only memory (ROM), a flash memory, an erasable ROM (EROM), a floppy disk, an optical disk, a hard disk, an optical fiber medium, a radio frequency (FR) network, etc. The computer signal includes any signal that can be transmitted via a transmission medium such as an electronic network channel, an optical fiber, air, an electromagnetic field, the RF network, etc.

As described above, in order to protect the data transmitted without encrypting the data in the data transmission system, the command-related information is encrypted and transmitted by the host device and the encrypted command-related information is decrypted and restored in the data storage device according to an embodiment of the present invention.

What is claimed is:

1. A method of protecting data in a data storage/retrieval system, comprising:

decrypting, by a data storage device, encrypted command-related information, wherein the encrypted command-related information includes a read/write command to be executed by a controller of the data storage device, and wherein the read/write command is encrypted by a host device using an encryption key;

interpreting the decrypted command-related information to generate interpreted commands; and executing the interpreted commands by the data storage device, wherein the encrypted read/write command is separate from any data that is for storage in a recording/restoring medium of the data storage device.

2. The method of claim 1, wherein the encrypted command-related information is generated by the host device of the data storage device.

3. The method of claim 1, wherein the data storage device is a HDD (hard disk drive).

4. The method of claim 3, wherein the command-related information includes at least one of read or write command information and LBA (logic block address) information and sector counter information used for addressing hard disks of the HDD.

5. The method of claim 1, wherein the command-related information includes at least one of read or write command information and address information.

6. A data storage device for protecting data in a data storage/retrieval system, comprising:

a drive interface for receiving encrypted command-related information;

a drive controller; and a memory having sequences of instructions stored thereon, wherein execution of said sequence of instructions by the drive controller causes the drive controller to perform the steps of:

decrypting the encrypted command-related information, wherein the encrypted command-related information includes a read/write command to be executed by a controller of the data storage device, and wherein the read/write command is encrypted by a host device using an encryption key;

interpreting the decrypted command-related information to generate interpreted commands; and executing the interpreted commands by the data storage device, wherein the encrypted read/write command is separate from any data that is for storage in a recording/restoring medium of the data storage device.

7. The data storage device of claim 6, wherein the drive interface includes a drive interface command register for storing the encrypted command-related information sent from the host device.

8. The data storage device of claim 6, wherein the drive controller includes a drive CPU command register for storing the decrypted command-related information.

9. The data storage device of claim 6, wherein the data storage device is a HDD (hard disk drive).

10. The data storage device of claim 6, wherein the command-related information includes at least one of read or write command information and address information.

* * * * *